(12) United States Patent
Van Elburg et al.

(10) Patent No.: US 8,732,321 B2
(45) Date of Patent: *May 20, 2014

(54) CONTROL ENTITY AND METHOD FOR SETTING UP A SESSION IN A COMMUNICATIONS NETWORK, SUBSCRIBER DATABASE AND COMMUNICATIONS NETWORK

(75) Inventors: Johannes Van Elburg, Oosterhout (NL); Stephen Terrill, Madrid (ES); Bo Aström, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,612

(22) Filed: May 23, 2012

(65) Prior Publication Data

US 2012/0246289 A1 Sep. 27, 2012

Related U.S. Application Data

(63) Continuation of application No. 12/668,353, filed as application No. PCT/NL2007/050346 on Jul. 11, 2007, now Pat. No. 8,214,512.

(51) Int. Cl.
*G06F 15/16* (2006.01)
(52) U.S. Cl.
USPC .......................... 709/228; 709/245; 709/223
(58) Field of Classification Search
USPC ................................. 709/227, 228, 245, 223
See application file for complete search history.

(56) References Cited

U.S. PATENT DOCUMENTS

| 2002/0037723 | A1 | 3/2002 | Roach |
| 2006/0136557 | A1 | 6/2006 | Schaedler et al. |
| 2006/0252425 | A1 | 11/2006 | Jiang |
| 2007/0058789 | A1 | 3/2007 | Lim et al. |
| 2007/0189215 | A1* | 8/2007 | Wu et al. ............... 370/331 |
| 2007/0253365 | A1* | 11/2007 | Hedberg et al. ....... 370/329 |

(Continued)

FOREIGN PATENT DOCUMENTS

| EP | 1722533 A1 | 11/2006 |
| WO | 2006125471 A1 | 11/2006 |

OTHER PUBLICATIONS

3rd General Partnership Project, "Technical Specification Group Services and System Aspects; Identification of Communication Services in IMS," 3GPP TR 23.816 V7.0.0 (Mar. 2006), (Release 7).

(Continued)

*Primary Examiner* — El Hadji Sall
(74) *Attorney, Agent, or Firm* — Coats and Bennett PLLC

(57) ABSTRACT

Control entity and method for setting up a session in a communications network, subscriber database, and communications network. The control entity advantageously has or has access to memory for storing information, and typically includes an input device for receiving a request to set up a session in the communications network, a processor unit for processing the request, and an output device for sending messages. The processor unit is arranged to determine if the request comprises a valid Communication Service Identifier (CSI) the CSI identifying the type of communication service of the session that is to be established over the communications network. And if the request does not comprise a valid Communication Service Identifier, to execute a default CSI procedure using default CSI information stored in the memory.

5 Claims, 6 Drawing Sheets

(56) References Cited

U.S. PATENT DOCUMENTS

| | | |
|---|---|---|
| 2008/0004051 A1 | 1/2008 | Sylvain |
| 2008/0160995 A1 | 7/2008 | Thiebaut et al. |
| 2008/0305811 A1 | 12/2008 | Cai et al. |
| 2009/0144429 A1* | 6/2009 | Astrom .................. 709/227 |

OTHER PUBLICATIONS

Rosenberg, J., "Identification of Communications Services in the Session Initiation Protocol (SIP)," IETF Standard Working Draft, Jul. 9, 2007.

* cited by examiner

CONTROL ENTITY AND METHOD FOR SETTING UP A SESSION IN A COMMUNICATIONS NETWORK, SUBSCRIBER DATABASE AND COMMUNICATIONS NETWORK

RELATED APPLICATIONS

This application is a continuation of U.S. patent application Ser. No. 12/668,353, filed Jan. 8, 2010, which is a national stage application of PCT/NL2007/050346, filed Jul. 11, 2007, the disclosures of each of which are incorporated herein by reference in their entirety.

TECHNICAL FIELD

The invention relates to a control entity, such as a Call/Session Control Function (CSCF) for an IP Multimedia Subsystem (IMS) network (Proxy CSCF (P-CSCF) or Serving CSCF (S-CSCF)). The invention further relates to a method for setting up a session in a communications network, such as an IMS network, subscriber database, such as a home subscriber server (HSS), arranged to be part of a communications network, method for registering a user terminal (UE—user equipment) in a communications network, communications network, computer program and a data carrier.

BACKGROUND

IP Multimedia Subsystem (IMS) is the technology defined by the Third Generation Partnership Project (3GPP) to provide IP Multimedia services over mobile communications networks (3GPP TS 22.228). IMS provides key features to enrich the end-user person-to-person communication experience through the integration and interaction of services. IMS allows new rich person-to-person (client-to-client) as well as person-to-content (client-to-server) communications over an IP-based network.

The IMS makes use of the Session Initiation Protocol (SIP) to set up and control calls or sessions between user terminals (UEs) or between UEs and application servers (AS). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

Within an IMS network, control entities, which set up and control calls or sessions, such as Call/Session Control Functions (CSCFs) operate as SIP entities within the IMS. The 3GPP architecture defines three types of CSCFs:

- the Proxy CSCF (P-CSCF) which is the first point of contact within the IMS for a user terminal UE (also referred to as SIP terminal);
- the Serving CSCF (S-CSCF) which provides services to the user that the user is subscribed to; and
- the Interrogating CSCF (I-CSCF) whose role is to select the correct S-CSCF during registration and, in a terminating session, to find the correct S-CSCF that serves the targeted user terminal.

IMS application services are implemented using application servers (AS). For any given public user identity, one or more application servers may be linked in by the S-CSCF on communication originated or terminated to that users UE. Application servers communicate with an S-CSCF via the IMS Service Control (ISC) interface and are linked into a SIP messaging route as required (e.g. as a result of the triggering of Initial Filter Criteria (IFC) downloaded into the S-CSCF for a given UE).

A user terminal UE registers in the IMS network using the specified SIP REGISTER method. This is a mechanism for attaching to the IMS network and announcing to the IMS network the network address at which a SIP user identity can be reached. In 3GPP, when a SIP terminal performs a registration, the IMS network authenticates the user using subscription information stored in a Home Subscriber Server (HSS), and allocates an S-CSCF to that user from the set of available S-CSCFs. Whilst the criteria for allocating S-CSCFs are not specified by 3GPP, these may include load sharing and service requirements. It is noted that the allocation of an S-CSCF is key to controlling, and charging for, user access to IMS-based services. Operators may provide a mechanism for preventing direct user-to-user SIP sessions which would otherwise bypass the S-CSCF.

During the registration process, it is the responsibility of the I-CSCF to select an S-CSCF, if an S-CSCF is not already selected. The I-CSCF receives the required S-CSCF capabilities from the HSS, and selects an appropriate S-CSCF based on the received capabilities. It is noted that S-CSCF allocation is also carried out for a user by the I-CSCF in the case where the user is called by another party, and the user is not currently allocated an S-CSCF. When a registered user subsequently sends a session request to the IMS network, the P-CSCF is able to forward the request to the selected S-CSCF based on information received from the S-CSCF during the registration process.

3GPP has defined the IMS Communication Service Identifier (ICSI) to explicitly identify the type of communication service that is to be established over the IMS network. The ICSI may be incorporated in a request initiating a session. The IMS network elements and the terminating user terminal UE need to have the same understanding of what communication service is requested. One example is to separate the two incompatible IMS implemented "voice" services from each other, PoC (Push-to-talk) and Multimedia telephony. The ICSI is used also for many other purposes such as:

Linking in Application Servers over IMS Service Control (ISC),

Discrimination in end-points to the correct software module,

Policy handling and enforcement, and

Interconnect between operators.

The IMS Communication Service Identifier (ICSI) has been included in 3GPP.

A problem may occur when a user terminal UE connects to an IMS network without including an ICSI which may lead to several nodes having to "guess" what communication service to execute their service logic for, see for example "3rd generation Partnership project; Technical Specification Group Services and System Aspects: identification of Communication Services in IMS (Release 7), 3GPP TS 23.816 version 7.0.0.

As described above, the reason why a user terminal UE may not include an ICSI may e.g. be that the user terminal DE is a legacy terminal that does not support the IMS Communication Service Identifier. However, it is also possible that the user terminal UE generates an IMS Communication Service Identifier that does not conform to any of the communication services defined in the IMS network and is not recognized by the IMS network. For both examples there is no appropriate way of dealing with such requests.

It is an object to enable processing of requests for sessions that do not properly specify the kind of service that is requested.

SUMMARY

This object is achieved by the methods as described below. Furthermore, the invention is embodied in a control entity, and a subscriber database, and an IP Multimedia Subsystem network. Advantageous embodiments are described in the further claims.

According to an aspect there is provided a Control Entity for setting up a session in a communications network. Hence, the invention allows that for a request to set up a session in the communications network, a proper identification of the type of communication service that is required for the request is available. The control entity, such as a P-CSCF or a S-CSCF, is enabled to identify the type of communication service required, even if the CSI as received in the request is not valid, e.g. is missing, not supported or not recognized. Subsequently the control entity can process the request accordingly.

According to an embodiment the at least one parameter may be a combination of the type of request and the type of media. In case the communications network is an IP Multimedia Subsystem network, the type of request may be one of INVITE request, MESSAGE request, REFER requests, SUBSCRIBE request, and the type of media may be one of audio, video.

According to an embodiment, in case the request comprises a Communication Service Identifier that is not recognized or supported by the control entity or the communications network, the default CSI procedure decides to allow or abort the request based on the default CSI information.

According to an embodiment the control entity is a Proxy Call Session Control Function that is arranged to act as a first point of contact within the communications network for a user terminal, and is arranged to receive a request from a user terminal for setting up a session in the communications network with a remote user terminal.

According to an embodiment the default CSI information is specific for the user terminal the request is received from.

According to an embodiment the control entity is a Serving Call Session Control Function that in use is arranged to provide services, and is arranged to receive a request from an application server for setting up a session in the communications network.

According to an embodiment the default CSI information is specific for the user terminal on behalf of which the request is made by the application server.

According to an embodiment the control entity is a Proxy Call Session Control Function and a Serving Call Session Control Function.

According to an aspect there is provided a method for setting up a session in a communications network.

According to an embodiment the at least one parameter may be a combination of the type of request and the type of media. In case the communications network is an IP Multimedia Subsystem network the type of request may be one of INVITE request, MESSAGE request, REFER requests, SUBSCRIBE request, and the type of media may be one of audio, video.

According to an embodiment there is provided a method as described, where in case the request comprises an Communication Service Identifier that is not recognized or supported by the control entity or the communications network, the default CSI procedure decides to allow or abort the request based on the default CSI information.

According to an embodiment the request is a request from a user terminal for setting up a session in the communications network with a remote user terminal.

According to an embodiment the default CSI information is specific for the user terminal the request is received from.

According to an embodiment the request is a request from an application server for setting up a session in the communications network.

According to an embodiment the default CSI information is specific for the user terminal on behalf of which the request is made by the application server.

According to an aspect there is provided a subscriber database arranged to be part of a communications network. The subscriber database comprises an input device for receiving a register message from a user terminal, a processor unit for processing the register message, and an output device. The subscriber database further comprises or has access to a memory for storing subscription information. The subscriber database is arranged to generate default CSI information based upon subscription information stored in the memory in reaction to the receipt of the register message, and to transmit the generated default CSI information to at least one control entity in the communications network via the output device. This allows that when a user terminal registers in the communications network, default CSI information is made available for the user terminal. This default CSI information can be used by control entities, e.g. P-CSCF or S-CSCF, for properly handling requests for set up of sessions, including identifying the appropriate communication services.

According to an embodiment the default CSI information is specific for the user terminal the register message is received from.

According to an embodiment the subscriber database is arranged to work in an IP Multimedia Subsystem network, and the subscriber database is a home subscriber server.

According to an aspect there is provided a method for registering a user terminal in a communications network, wherein a subscriber database performs the steps of receiving a register message from a user terminal, generating default CSI information based upon subscription information in reaction to the receipt of the register message, and transmitting the generated default CSI information to at least one control entity in the communications network.

According to an embodiment the default CSI information is specific for the user terminal the register message is received from.

According to an aspect there is provided an IP Multimedia Subsystem network, comprising at least one control entity as described and at least one subscriber database as described.

According to an embodiment the at least one control entity is at least one Proxy Call Session Control Function as described and at least one Serving Call Session Control Function as described.

According to an aspect there is provided a computer program, when loaded on a computer, provides the computer with the functionality to perform one of the methods described.

According to an aspect there is provided a data carrier, comprising a computer program as described.

BRIEF DESCRIPTION OF THE DRAWINGS

Embodiments will now be described, by way of example only, with reference to the accompanying schematic drawings in which corresponding reference symbols indicate corresponding parts, and in which.

DETAILED DESCRIPTION

In the following it will be described how the invention may be implemented in an IMS network. It is apparent to a person skilled in the art that the IMS network is only an example of a communications network where the invention could apply, the invention may also be implemented in other communications networks, like a GSM, Code Division Multiple Access (CDMA), Time Division Multiple Access (TDMA), Universal Mobile Telecommunication System (UMTS), or 4G network.

IMS Network

Figure 1:
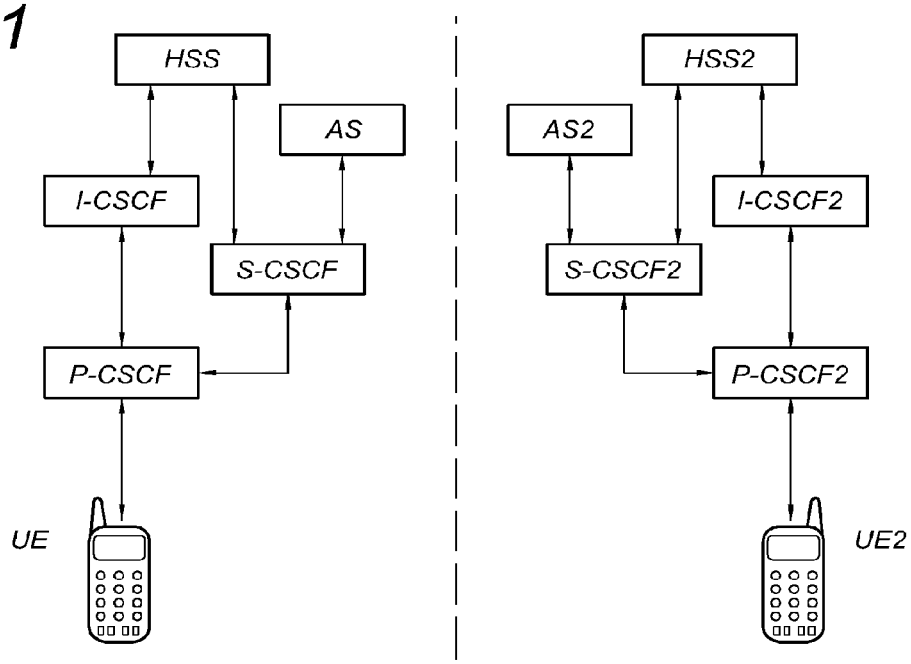
FIG. 1 schematically depicts an IMS network.

FIG. 1 schematically depicts the main components of an IMS network. FIG. 1 shows a user terminal UE (also referred to as IMS terminals) that is arranged to set up a session or a call with each other. Such a user terminal UE is arranged to connect to an IMS network by using the standard Internet Protocol (IP). User terminals UE may for instance be a mobile telephone, a PDA, a computer.

The main components of the IMS network shown in FIG. 1 are, as already mentioned above, Call/Session Control Functions (CSCFs) that operate as SIP entities within the IMS network, to control the sessions within the IMS network.

Three types of CSCFs are provided:
the Proxy CSCF (P-CSCF) which is the first point of contact within the IMS for a SIP terminal;
the Serving CSCF (S-CSCF) which provides services to the user that the user is subscribed to; and
the Interrogating CSCF (I-CSCF) whose role is to select the correct S-CSCF during registration and, in a terminating session, to find the correct S-CSCF that serves the targeted user terminal.

Furthermore, FIG. 1 comprises an application server AS which interacts with the S-CSCF. The application server (AS) provides services to user terminal UE, such as multimedia telephony services, push-to-talk services, messaging services, Voice Call Continuity (VCC) services, etc. These services can be further detailed, with originating/terminating call barring, originating/terminating call screening, call diversion services, calling line presentation services, as examples of services provided for multimedia telephony. It will be understood that more application servers AS may be provided.

The application server AS may also initiate sessions itself, for instance for initiating a Wake up service, Click to talk (Call setup via pushing a phone item on a website, the web portal interacting with an application server capable of setting up a session) or an automated retry. A session that is set up by the application server AS uses the S-CSCF, but does not use an originating P-SCSF. This will be referred to as application server initiated originated SIP communication.

FIG. 1 further shows a Home Subscriber Server HSS, which in fact is a database comprising information about the IMS network. The HSS may comprise information about the user's subscription, i.e. user profiles. Also, the HSS plays an important role when a user terminal registers to the IMS network, as it authenticates and authorizes the user terminal UE. HSS comprises information about the location of a user (allocated S-CSCF) and provides information to an S-CSCF that is used as part of the registration procedure, e.g. by providing the S-CSCF with authentication parameters (which authentication method to be used and data for performing the chosen authentication method). HSS also downloads the user profile to the S-CSCF that e.g. contains the Initial Filter Criteria instructing the S-CSCF which application servers AS that shall be linked in over the ISC interface for originating and terminating SIP transactions.

As described above, the P-CSCF is the first point of contact for the user terminal UE. So, all messages that come from or go to the user terminal UE travel through the P-CSCF. At registration, a P-CSCF is assigned to the user terminal UE. The assigned P-CSCF remains the same for a user terminal UE until a new registration is made.

The S-CSCF is located in the home network and makes contact with the called subscriber's network to establish a session between the two user terminals UEs. The called user terminal UE may belong to the same IMS network as the calling user or belong to an outside IMS network or even an outside network of another type, such as PSTN/PLMN. In latter case, the call is routed to PSTN/ISDN via the BGCF (Border Gateway Control Function) and MGCF (Media Gateway Control Function) functional entities.

The I-CSCF is located near the border of the part of the IMS network belonging to a certain provider. I-CSCF's have an IP-address that is known (or retrievable) to other I-CSCF's such that I-CSCF's can find each other and exchange SIP packets. The I-CSCF use information from the HSS to locate the S-CSCF serving the user terminal UE within its domain and forward a SIP message received from a remote IMS network to that S-CSCF.

FIG. 1 is divided in two parts by a vertical dashed line. The left hand side has been described above. However, the right hand side of FIG. 1 forms a mirror image of the left hand side and comprises similar devices and nodes as the left hand side: a user terminal UE2, a the Proxy CSCF (P-CSCF2), a Serving CSCF (S-CSCF2), an Interrogating CSCF (I-CSCF2), an application server AS2 and a Home Subscriber Server HSS2.

Both the left hand side and the right hand side form part of the IMS network belonging to a certain provider and the dashed line indicates the border of the part of the IMS network belonging to a certain provider. Below, the explanation and embodiments focus on one side only, but of course it will be understood that the embodiments may be put to practice in the total IMS network.

It will be understood that an IMS network may comprise more and other nodes than shown in FIG. 1. Nodes may also be present more than once, for instance for load balancing or organizational reasons. Also, nodes that are shown as separate nodes may in fact be formed as one element, incorporating the functions of the incorporated nodes. Also, nodes may be split in two or more nodes.

General Computer

Figure 2A:
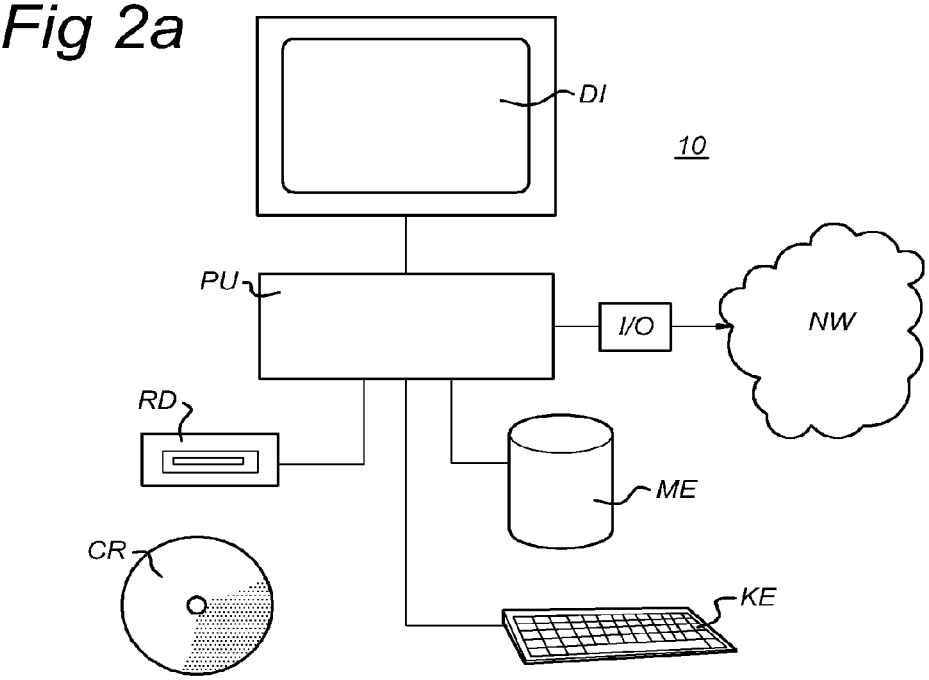
FIG. 2a schematically depicts a computer.

In fact, all elements shown in FIG. 1 may be formed as a computer. FIG. 2a schematically shows a general embodiment of an example of a computer. The description may refer to several kind of devices, such as personal computers, servers, laptops, personal digital assistances (PDA), palmtops, telephones. All these devices are different kind of computers.

FIG. 2a shows a schematic block diagram of an embodiment of a computer 10, comprising a processor unit PU for performing arithmetical operations. The processor unit PU is connected to memory ME that may store instructions and data. The memory ME may be formed by one or more of a tape unit, hard disk, a Read Only Memory (ROM), Electrically Erasable Programmable Read Only Memory (EEPROM), a Random Access Memory (RAM). The memory may comprise instructions that are readable and executable by the processor unit PU to enable the computer 10 to perform the embodiments described.

The processor unit PU may also be connected to one or more input devices, such as a keyboard KE, and one or more output devices, such as a display DI, and one or more reading units RU to read for instance a floppy, CD ROM's CR, a DVD.

The computer 10 shown in FIG. 2a also comprises an input output device (I/O) that is arranged to communicate with other computers (not shown) via a network, for instance the IMS network. Of course, the input output device (I/O) may also be formed as a separate input device I and output device O.

However, it should be understood that there may be provided more and/or other memory units, input devices and read devices known to persons skilled in the art. Moreover, one or more of them may be physically located remote from the processor unit PU, if required. The processor unit PU is shown as one box, however, it may comprise several processing units functioning in parallel or controlled by one main processor unit that may be located remote from one another, as is known to persons skilled in the art.

It is observed that, although all connections in FIG. 1 are shown as physical connections, one or more of these connections can be made wireless. They are only intended to show that "connected" units are arranged to communicate with one another in some way.

The computer 10 is shown as a computer, but can be any signal processing system with analog and/or digital and/or software technology arranged to perform the functions discussed here.

Figure 2B:
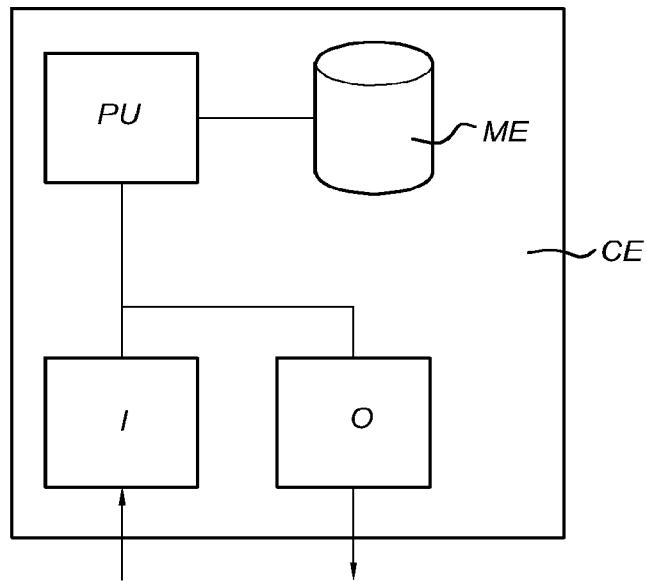
FIG. 2b schematically depicts a control entity such as a P-CSCF or S-CSCF according to an embodiment, FIG. 2c schematically depicts a subscriber database such as a Home Subscriber Server (HSS) according to an embodiment, FIGS. 3 and 4 schematically depict a flow diagram according to an embodiment, and FIGS. 5, 6 and 7 schematically depict a sequence diagram according to embodiments.

FIG. 2b shows a control entity CE, such as a P-CSCF and a S-CSCF in a more schematic way. The control entity CE comprises the processor unit PU, arranged to communicate with the memory ME. The control entity CE further comprises an input device I and an output device O (possibly integrated in one input output device I/O) for receiving and transmitting respectively.

Figure 2C:
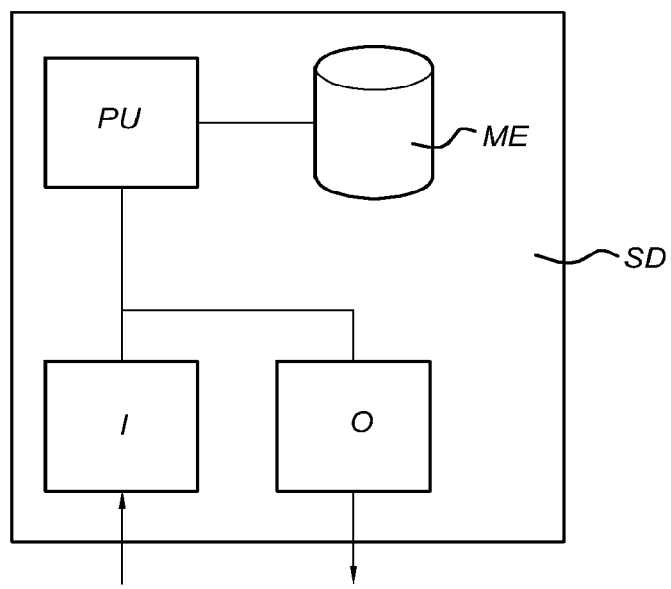

FIG. 2c shows a subscriber database SD, such as a Home Subscriber Server (HSS) in a more schematic way. The subscriber database SD comprises the processor unit PU, arranged to communicate with the memory ME. The subscriber database SD further comprises an input device I and an output device O (possibly integrated in one input output device I/O) for receiving and transmitting respectively.

Registering/Inviting

In order to be registered in the network, user terminals UE may send a REGISTER message to the IMS network, the REGISTER message being provided according to the SIP-protocol. As described above, when a user terminal UE registers in the IMS network, the specified SIP REGISTER procedure may be used. As a result of the SIP REGISTER procedure, the network address at which the user terminal UE can be reached is known to the S-CSCF selected to serve that user, and the allocated S-CSCF will be known at the HSS. Also, a S-CSCF and a P-CSCF are assigned to the user terminal UE as part of the Registration procedure.

After registration has taken place the user terminal UE may send an INITIAL REQUEST message to the IMS network to open a session with a remote user terminal UE, the INITIAL REQUEST message being provided according to the SIP-protocol. The INITIAL REQUEST message may trigger the IMS network to set up a session with a certain remote end user UE.

The INITIAL REQUEST may be any kind of request or in particular a SIP request message, including INVITE request, MESSAGE request, REFER requests, SUBSCRIBE request, etc., as will be understood by a skilled person. The term INITIAL REQUEST as used here refers to all such requests. In fact, an INITIAL REQUEST does not necessarily be the first message that is exchanged between the user terminal UE and the IMS network.

As described above, user terminals UE may use the IMS network for different kind of services, such as initiating a peer to peer communication session or a multimedia conference session or a messaging session. In order to indicate what kind of service is requested, the INITIAL REQUEST message may comprise an ICSI.

The ICSI provided by the user terminal UE at the beginning of session setup identifies a particular communication service provided by the IMS network. It allows that for a particular communication service the correct application logic can be invoked in the terminals and in the correct application servers (AS's) to be linked in over the ISC interface. This ensures that requests do not have to travel through a number of not applicable AS's before the correct application logic can be executed. This also ensures efficient handling of different communication services provided by the IMS network.

Furthermore it allows different bearer/media/QoS policies to be enforced for the different communication services.

ICS's may be used to:
decide which media authorization policies to apply
decide which communication service authorization policies to apply
decide which priority to assign in overload situations
decide which interworking to apply
decide which is the correct terminating device to route to
decide which charging policies to apply
decide which application to invoke on the terminating device
to communicate the kind of communication services a UE is capable to provide (presence)
decide which application server to invoke
decide which interoperator service agreements to apply.

Some user terminals UE will be arranged to include an ICSI in their INITIAL REQUEST, indicating which service is requested. Other user terminals UE may not be arranged to include an ICSI, making it difficult for the IMS network to know what kind of service is requested by the user terminal UE. As a result, the IMS network will have to guess what kind of service is requested and may perform a "best attempt" to identify the requested service.

Based on the above it will be understood that the information about the requested service needs to be known at different nodes in the IMS network. Without an explicit means to identify what service is requested, each node that needs to know this is required to make a guess. The S-CSCF may try to identify the application server AS to link in based upon very complicated iFCs. The term iFC means Initial Filter Criteria, which is a component of the subscription data downloaded to the S-CSCF at server assignment during registration. It tells the S-CSCF on what conditions an AS shall be linked in over the ISC interface. The P-CSCF may have to make a guess in order to understand the correct way to proceed.

If no ICSI is provided, it is not ensured that all the nodes in the path of the request will all correctly identify the requested service. Also, when an ICSI is provided that is not supported by the user terminal UE that does not conform to any of the communication services defined in the IMS network, a similar problem arises.

Embodiments

According to the embodiments it is proposed to centralize a "default-ICSI" decision, and to have the enforcement of this decision divided on two nodes, depending on which traffic case to execute. It is proposed to provide a mechanism to instruct a P-CSCF how to handle an INITIAL REQUEST not comprising an ICSI or comprising an ICSI that is not supported or recognised by the IMS network.

It is further proposed to provide a mechanism to instruct the S-CSCF how to handle an INITIAL REQUEST not comprising an ICSI or comprising an ICSI that is not supported or recognised by the IMS network, both for INITIAL REQUESTS originating from a user terminal UE or an application server AS.

Both mechanisms may comprise the option of adding a default ICSI to the INITIAL REQUEST if the INITIAL REQUEST does not comprise an ICSI, or to decide if an INITIAL REQUEST comprising an ICSI that is not recognized or supported is to be allowed or not.

The default ICSI information is used by a default ICSI procedure for determining the default communication service to use for a particular call initiation and subscriber.

Registration

According to an embodiment, it is proposed to extend the registration procedure as described above, including setting default ICSI information in the IMS network. As part of the registration procedure of a particular user terminal UE, default ICSI information about this particular user terminal UE is provided to specific nodes in the IMS network.

A user terminal UE may register in the normal fashion and the registration procedure is herein proposed to be extended with providing default ICSI information to the P-CSCF, to enable the P-CSCF to determine what to do when an INITIAL REQUEST is received that does not comprise an ICSI or comprises an ICSI that is not supported or recognised by the IMS network. The default ICSI information will be provided or made accessible to the IMS network by the HSS.

Furthermore, the registration procedure is herein proposed to be extended with providing default ICSI information to the S-CSCF, to enable the S-CSCF to determine what to do when an application server initiates originated SIP communication that does not comprise an ICSI or comprises an ICSI that is not supported or recognised by the IMS network is received.

The proposed embodiments can be used for any SIP communication in a new SIP session. The P-SCSF or the S-CSCF are arranged to execute the default ICSI procedure using the default ICSI information relevant for the respective user terminal UE. The default ICSI information is provided or made accessible to the P-SCSF and/or S-CSCF during the registration.

The content of the default ICSI information can be different for different user terminals UE providing a relatively flexible IMS network. The content of the default ICSI information may for instance depend on specific subscription information of the user terminal UE, which is known in the HSS.

Default ICSI Procedure

Upon successful registration default ICSI information is provided to the P-CSCF and/or the S-CSCF, based on which the P-CSCF and/or S-CSCF may execute the default ICSI procedure to decide how to process an INITIAL REQUEST not comprising a valid ICSI. The default ICSI information is specific for the registered user terminal UE. Four options can be identified:

1) No default ICSI is enforced; this means that no ICSI is added to the INITIAL REQUEST message on calls originated through it.

2) A default ICSI is enforced; this means that a default ICSI is added to the INITIAL REQUEST message.

3) A default-ICSI policy is performed, which is a policy that is performed by the P-CSCF or the S-CSCF and is evaluated when a session is initiated without an appropriate ICSI. The evaluation may either result in:
   3a) No default ICSI is enforced, see 1) above.
   3b) A default ICSI is enforced, see 2) above.

4) When the INITIAL REQUEST comprises an ICSI that is not recognized or supported, the P-CSCF or the S-CSCF may decide to allow this INITIAL REQUEST or the reject the INITIAL REQUEST.

Option 3) may be in the form of an IF . . . ELSE . . . construction. For instance:
   IF method=INVITE and media=audio
   THEN default ICSI=multimedia telephone (option 3b)
   ELSE no default ICSI (option 3a).

The default-ICSI policy can for example use a similar format/syntax as is used to send the iFC (Initial Filter Criteria) from the HSS to the S-CSCF.

It is proposed that default ICSI information is stored in the P-SCSF and/or S-CSCF after it has been made available by the HSS or is accessible by the P-SCSF and/or S-CSCF for a particular user that for instance has registered to the IMS network. The default ICSI information may be specific for the user terminal UE who initiated the session or on behalf of which the session is initiated. This provides a flexible system that can be optimized for each user terminal UE.

Default ICSI Information

As described above, the default ICSI information is stored in or made accessible to the P-SCSF and/or S-CSCF to be used in the default ICSI procedure.

The default ICSI information comprises for each associated user terminal UE information about if a default ICSI is to be enforced or not, and if so, what ICSI is to be enforced. Furthermore, the default ICSI information may comprise a condition that first the default-ICSI policy is to be performed, comprising testing a condition. This last information could be different for each registered user terminal UE or may be specific for the P-SCSF or S-CSCF handling the INITIAL REQUEST.

Also, the default ICSI information may comprise information how to proceed with the INITIAL REQUEST when the INITIAL REQUEST comprises an ICSI that is not supported or recognized by the P-CSCF, S-CSCF or the IMS network. For those cases, the ICSI default information may comprise information whether to allow the INITIAL REQUEST or to abort the INITIAL REQUEST.

According to an embodiment, the default ICSI information database as made available to the P-SCSF and/or the S-CSCF may be structured as shown in table 1. Upon registration of a user terminal UE new default ICSI information may be added to the default ICSI information database. When a registration of a user terminal UE lapses, the corresponding default ICSI information may be removed from the default ICSI information database.

So, according to an embodiment, the default ICSI procedure comprises testing at least one parameter in the INITIAL REQUEST and deciding based on the at least one tested parameter and the default ICSI information to add a default ICSI to the INITIAL REQUEST, where the default ICSI is specified by the default ICSI information, or not to add a default ICSI to the INITIAL REQUEST. The parameter may be a combination of:
- the type of request, being at least one of INVITE request, MESSAGE request, REFER requests, SUBSCRIBE request,
- the type of media requested, being at least one of audio, video.

| User Terminal | Default ICSI? | Default ICSI= | IF ICSI unrecognized or not supported |
|---|---|---|---|
| 1 | Yes | multimedia telephony | Abort |
| 2 | Yes | push to talk | Allow |
| 3 | No | — | Abort |
| 4 | No | — | Allow |
| 5 | Execute policy | If method = INVITE, multimedia telephony If else, messaging | Abort |
| 6 | Execute policy | If method = INVITE and media = audio, multimedia telephony If else, No default ICSI | Allow |

HSS

According to an embodiment, the HSS is a computer as shown in FIGS. 2a and 2c, arranged to perform the functionality described.

Figure 3:
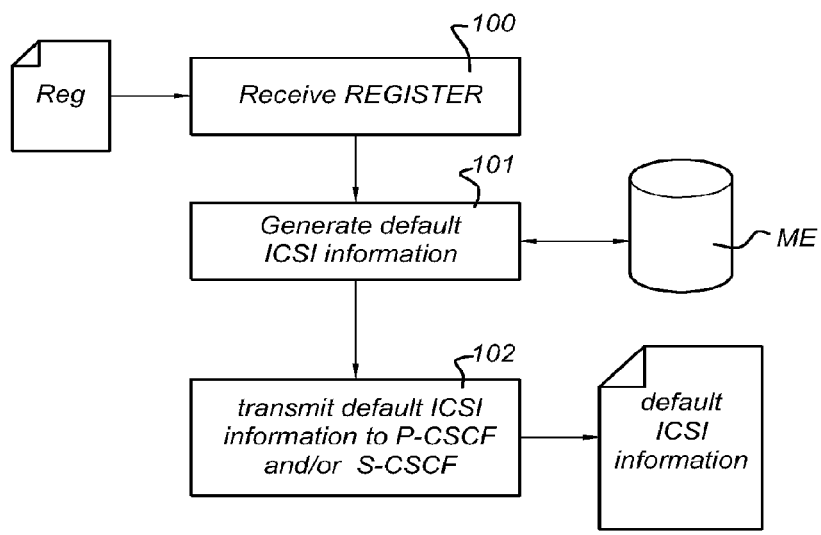

FIG. 3 schematically depicts a flow diagram as may be performed by the HSS during a registration procedure according to an embodiment. In a first action 100, the HSS receives a REGISTER message from a user terminal UE. In reaction to the receipt of this REGISTER message, the HSS generates default ICSI information based upon subscription information stored in memory ME of the HSS. The generated default ICSI information is then transmitted to the P-CSCF and/or the S-CSCF in action 102. The P-CSCF and/or the S-CSCF store this default ICSI information for later use.

Figure 5:
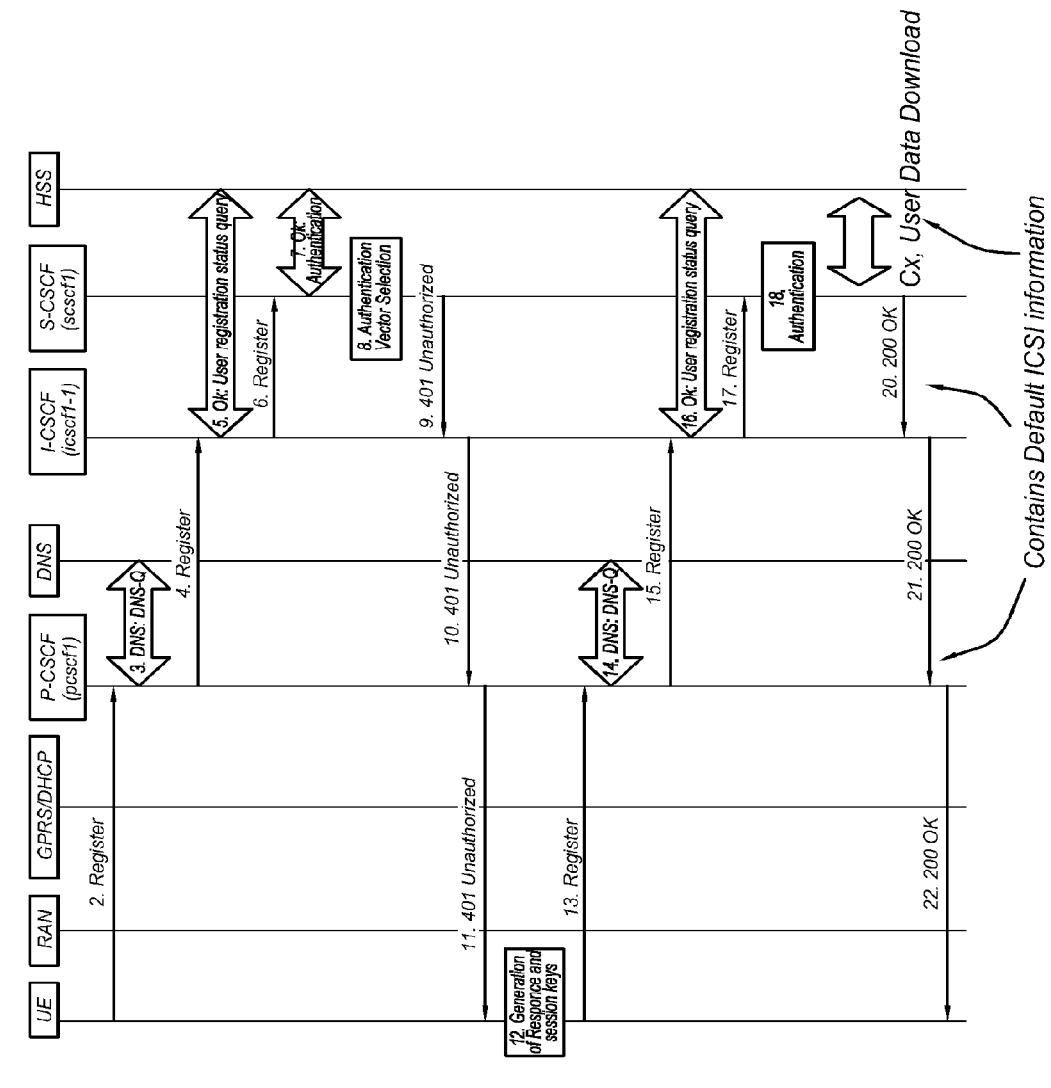

Of course, it will be understood that the registration procedure itself may comprise many more actions, such as authentication and authorizing actions, as will be understood by a skilled person. A detailed example of a registration procedure according to the 3GPP specifications (TS 23.228 and TS 24.229) is shown in FIG. 5 that will be understood by a skilled person. In FIG. 5 the actions that relate to the default ICSI information as described here are indicated.

The default ICSI information may be transferred to the S-CSCF as part of the user data download over the Cx interface in the registration procedure. S-CSCF inserts this data in the final 200 OK of the Registration procedure. P-CSCF does not forward the information in the 200 OK sent to the user terminal.

FIG. 5 depicts a message sequence diagram comprising a number of actions as may be performed during registering.

In a first action 2 a REGISTER message (2.Register in FIG. 5) is transmitted from the user terminal UE to the P-CSCF. The purpose of this message is to register the user's SIP URI with a S-CSCF in the home network.

In a next action 3 a DNS action is performed by the P-CSCF by consulting a DNS database. Based on the user's SIP URI, the P-CSCF determines that the user terminal UE is registering from a visiting domain and performs the DNS queries to locate the I-CSCF in the home network. When forwarding the REGISTER the P-CSCF needs to specify the protocol, port number and IP address of the I-CSCF server in the home network to which to send the REGISTER. The P-CSCF tries to find this information by querying the DNS.

In a next action 4 the REGISTER message is forwarded by the P-CSCF to the I-CSCF. The P-CSCF needs to be in the path for all mobile originated and mobile terminated requests for this user. The P-CSCF binds the public user identity under registration to the Contact header supplied by the user.

In a next action 5 the user registration status query is checked by the I-CSCF by consulting the HSS. The I-CSCF requests information related to the subscriber registration status by sending the private user identity, public user identity and visited domain name to the HSS. The HSS returns the S-CSCF required capabilities and the I-CSCF uses this information to select a suitable S-CSCF.

In a next action 6 the REGISTER message is forwarded by the I-CSCF to the S-CSCF.

In a next action 7 authentication is executed by the S-CSCF by consulting the HSS.

In a next action 8 Authentication Vector Selection is performed by the S-CSCF. The S-CSCF selects an authentication vector for use in the authentication challenge.

In next actions 9, 10 and 11 the S-CSCF sends the authentication challenge to the user terminal UE via the I-CSCF and the P-CSCF. The P-CSCF removes any keys received in the "401 unauthorized response" and forwards the rest of the response to the UE.

In next action 12 upon receiving the "401 unauthorised response", the user terminal UE calculates the response, and sends the response in the REGISTER message to the P-CSCF in a next action 13.

In a next action 14 a DNS action is performed by the P-CSCF by consulting the DNS.

In a next action 15 the REGISTER message is forwarded by the P-CSCF to the I-CSCF.

In a next action 16 the user registration status query is checked by the I-CSCF consulting the HSS. The HSS returns the S-CSCF name which was previously selected in action 5

In a next action 17 the REGISTER message is forwarded by the I-CSCF to the S-CSCF. Upon receiving an integrity protected REGISTER carrying the authentication response, S-CSCF checks the response. If the check is successful then the user has been authenticated and the public user identity is registered in the S-CSCF.

In a next action 18 authentication is completed. In response to that, user data is downloaded over the Cx interface from the HSS to the S-CSCF comprising default ICSI information. Next, the registration is completed by forwarding a "200 OK" message comprising default ICSI information from the S-CSCF to the I-CSCF and the P-CSCF in actions 20, 21. In action 22 a "200 OK" message is transmitted from the P-CSCF to the user terminal UE.

It is noted that this flow diagram is not complete.

Originating Case

In the originating case when a user terminal UE initiates a session, the user terminal UE sends an INITIAL REQUEST message to the P-CSCF which serves as its outbound proxy.

When the INITIAL REQUEST does not comprise an ICSI or comprises an ICSI that is not recognized or supported by the IMS network, the default ICSI procedure is executed by the P-SCSF using the stored default ICSI information to decide how to process this INITIAL REQUEST message. Based on the default ICSI information stored in the P-SCSF or being accessible by the P-CSCF, that is associated with the particular user terminal UE sending the INITIAL REQUEST, the P-SCSF evaluates if an ICSI is to be added to the INITIAL REQUEST message or not, and if so, what ICSI should be added to the INITIAL REQUEST message. After the ICSI is added to the INITIAL REQUEST (or not), the INITIAL REQUEST message is further processed in the same way all INITIAL REQUEST messages are processed, for instance forwarded. So, four options can be identified:

1) No default ICSI is enforced; this means that no ICSI is added by the P-SCSF to the INITIAL REQUEST message on calls originated through it.

2) A default ICSI is enforced; this means that a default ICSI is added by the P-SCSF to the INITIAL REQUEST message.

3) A default-ICSI policy is performed, which is a policy that is performed by the P-CSCF or the S-CSCF and is evaluated when the user terminal UE initiates a session without including an appropriate ICSI. The evaluation may either result in:

3a) No default ICSI is enforced, see 1) above.

3b) A default ICSI is enforced, see 2) above.

4) When the INITIAL REQUEST comprises an ICSI that is not recognized or supported, the P-CSCF may decide to allow this INITIAL REQUEST or the reject the INITIAL REQUEST.

P-CSCF

Figure 4:
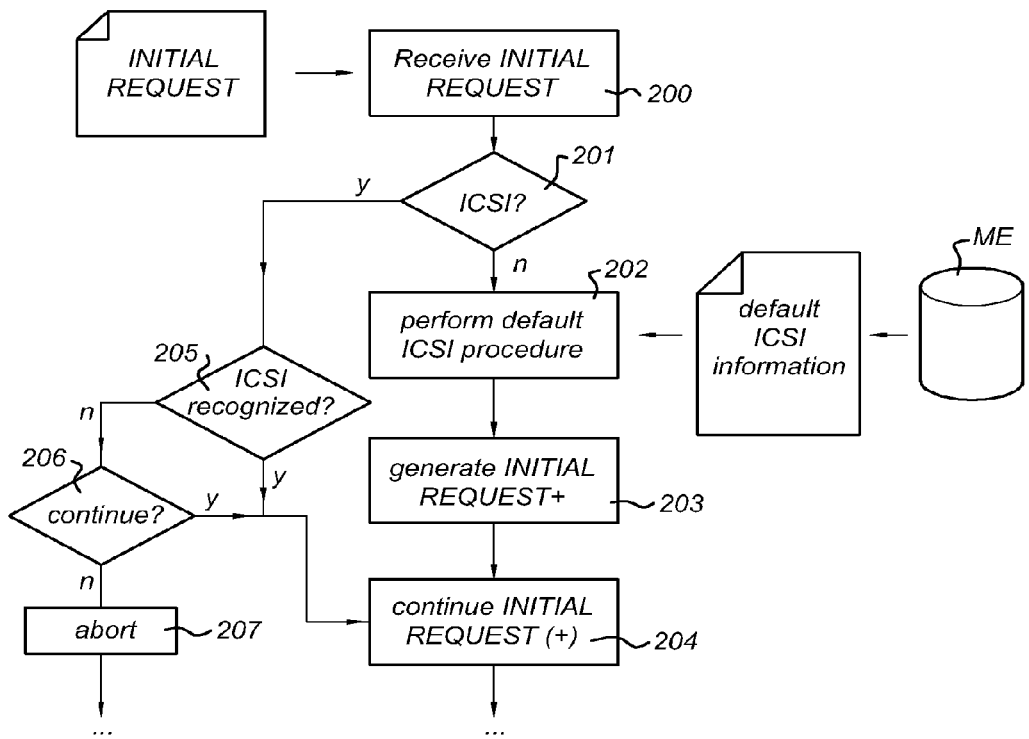

According to an embodiment, the P-CSCF is a computer as shown in FIGS. 2a and 2b, arranged to perform the functionality described. FIG. 4 schematically depicts a flow diagram as may be performed by the P-CSCF according to an embodiment.

In a first action 200, the P-CSCF receives an INITIAL REQUEST message from a user terminal UE. First, in action 201, it is checked if the INITIAL REQUEST comprises an ICSI.

If the INITIAL REQUEST does not comprise an ICSI, in action 202 the default ICSI procedure is performed using the default ICSI information from memory ME. In fact, in action 202 it is decided to choose for option 1), 2) or 3) as described above. Based on the default ICSI information a new INITIAL REQUEST+ message is generated in action 203, now possibly comprising an ICSI. Finally, in action 204, the normal INITIAL REQUEST procedure is continued using the new INITIAL REQUEST+ message.

If in action 201 it is determined that the INITIAL REQUEST message does comprise an ICSI, continues with action 205, in which it is checked if the ICSI comprised in the INITIAL REQUEST is recognized (or supported) by the P-SCSF. If so, the P-SCSF may continue with action 204. If the ICSI is not recognized (or supported), the P-CSCF may continue with action 206 in which it is decided, based on the default ICSI information, to allow the INITIAL REQUEST and continue with action 204, or not to allow the INITIAL REQUEST and abort the set-up of the session.

Figure 6:
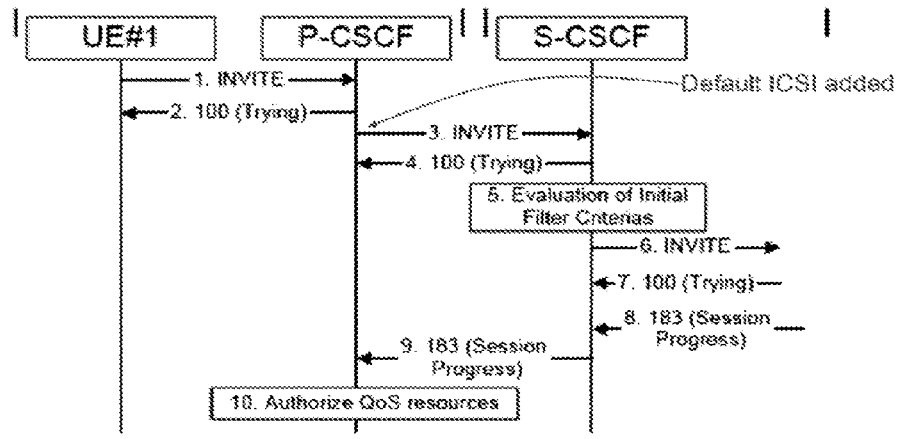

FIG. 6 shows a more default example according to the 3GPP specifications (TS 23.228 and TS 24.229), that will be readily be understood by a skilled person. A SIP INVITE is used to illustrate the principle. The same principle is applicable also for other SIP methods.

FIG. 6 depicts a message sequence diagram comprising a first action 1 in which an INVITE is sent from a user terminal UE#1 to the P-CSCF.

In action 2, a "100 Trying" message is sent back by the P-CSCF to the user terminal UE#1.

In a next action 3, the P-CSCF forwards the INVITE to the S-CSCF and the default ICSI information is added.

In action 4, a "100 Trying" is sent back by the S-CSCF to the P-CSCF.

In a next action 5, evaluation of Initial Filter Criterias is performed by the S-CSCF.

In a next action 6, the INVITE is further forwarded into the network by the S-CSCF.

In action 7, a "100 Trying" message is received by the S-CSCF.

In an action 8, a "183 Session progress" is received by the S-CSCF which is forwarded to the P-CSCF in an action 9. After this, QoS resources are authorized by the P-CSCF.

It is noted that this flow diagram is not complete.

Terminating Case

In the above example (originating case) the default ICSI procedure was executed by the P-SCSF at the home side of the IMS network. According to this example, an INITIAL REQUEST message arrives in an I-CSCF on the terminating side, where the INITIAL REQUEST does not comprise an ICSI or comprises an ICSI that is not recognized by the IMS network.

The I-CSCF queries the HSS to find out to which S-CSCF the user terminal UE to which the INITIAL REQUEST is addressed has been allocated. When the INITIAL REQUEST reaches the appropriate S-CSCF, the S-CSCF may detect that the INITIAL REQUEST does not contain an ICSI or comprises an ICSI that is not recognized/supported by the IMS network. The S-CSCF comprises or has access to default ICSI information and uses this information to perform the default ICSI procedure as described above to decide whether or not to add an ICSI to the INITIAL REQUEST, and if so, to decide what ICSI is added to the INITIAL REQUEST. So, again four options can be identified:

1) No default ICSI is enforced; this means that no ICSI is added to the INITIAL REQUEST message by the S-CSCF on calls originated through it.

2) A default ICSI is enforced; this means that a default ICSI is added to the INITIAL REQUEST message by the S-CSCF.

3) A default-ICSI policy is performed, which is a policy that is performed by the S-CSCF and is evaluated when the session is initiated without including an appropriate ICSI. The evaluation may either result in:

3a) No default ICSI is enforced, see 1) above.

3b) A default ICSI is enforced, see 2) above.

4) When the INITIAL REQUEST comprises an ICSI that is not recognized or supported, the S-CSCF may decide to allow this INITIAL REQUEST or the reject the INITIAL REQUEST.

AS-Originated Calls

As described above, not all sessions are initiated by user terminals UE. Also application servers AS may initiate sessions, so called application server initiated originated SIP communication. An application server AS may initiate a session either on behalf of a user terminal UE or as an application server independent procedure. The application server does this by sending an INITIAL REQUEST to the associated S-CSCF. When the application server AS does so on behalf of the user terminal UE, the INITIAL REQUEST is marked with an "ORIG" parameter to instruct the S-CSCF that the originating call behaviour of the associated user terminal UE is to be applied (invocation of originating services, no forking, etc.). If an INITIAL REQUEST of the application server AS does not comprise an ICSI or comprises an ICSI that is not recognized by the IMS network, the S-CSCF may perform a similar functionality as the P-SCSF when receiving an INITIAL REQUEST with no valid ICSI. Default ICSI information is provided to the S-CSCF, based on which the S-CSCF can perform the default ICSI procedure to decide how to process an INITIAL REQUEST not comprising valid ICSI. Again, four options can be identified:

1) No default ICSI is enforced; this means that no ICSI is added to the INITIAL REQUEST message by the S-CSCF on calls originated through it.

2) A default ICSI is enforced; this means that a default ICSI is added to the INITIAL REQUEST message by the S-CSCF.

3) A default-ICSI policy is performed, which is a policy that is performed by the S-CSCF and is evaluated when the session is initiated without including an appropriate ICSI. The evaluation may either result in:

3a) No default ICSI is enforced, see 1) above.

3b) A default ICSI is enforced, see 2) above.

4) When the INITIAL REQUEST comprises an ICSI that is not recognized or supported, the S-CSCF may decide to allow this INITIAL REQUEST or the reject the INITIAL REQUEST.

So, for calls originated by the application server AS on behalf of the user terminal UE, the S-CSCF can apply the same principles as described for the terminating case above: the S-CSCF acts as the enforcement point in the termination case and the cases where a session is initiated/originated by an application server AS, where the P-CSCF is the enforcement point for the originating case initiated by the user terminal UE.

When the INITIAL REQUEST does not comprise an ICSI and the stored default ICSI information evaluates to "insert ICSI value", the S-CSCF executes the default ICSI procedure, adds the appropriate ICSI to the INITIAL REQUEST. After the ICSI is added to the INITIAL REQUEST (or not), the INITIAL REQUEST message is further processed in the same way all INITIAL REQUEST messages are processed, for instance forwarded.

Figure 8:
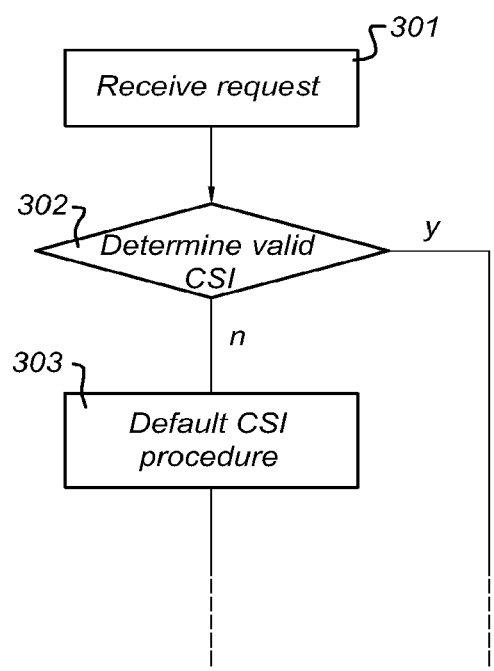
FIG. 8 depicts a flow diagram according to a control entity according to an embodiment.

FIG. 8 provides a general flow diagram according to an embodiment. FIG. 8 shows a flow diagram as may be performed by a control entity CE, such as a P-CSCF, a S-CSCF or a P-CSCF and a S-CSCF. According to FIG. 8, the control entity performs:

receiving a request for setting up a session in the communications network in action 301, determining if the request comprises a valid Communication Service Identifier (CSI), the Communication Service Identifier identifying the type of communication service of the session that is to be established over the communications network in action 302, and if the request does not comprise a valid Communication Service Identifier, performing action 303:

executing a default CSI procedure using default CSI information.

So, based on the above it will be understood that the default ICSI information is provided or made accessible to the P-SCSF and the S-CSCF during registration, and the S-CSCF acts as the enforcement point in the termination case and the case wherein a session is initiated by the application server AS, where the P-CSCF is the enforcement point for the originating case initiated by the user terminal UE.

S-CSCF (for Terminating Option and AS Option):

According to an embodiment, the S-CSCF is a computer as shown in FIGS. 2a and 2b, arranged to perform the functionality described.

The actions as may be performed by the S-CSCF are in fact similar to the actions as may be performed by the P-CSC as already described above with reference to FIG. 4.

Figure 7:
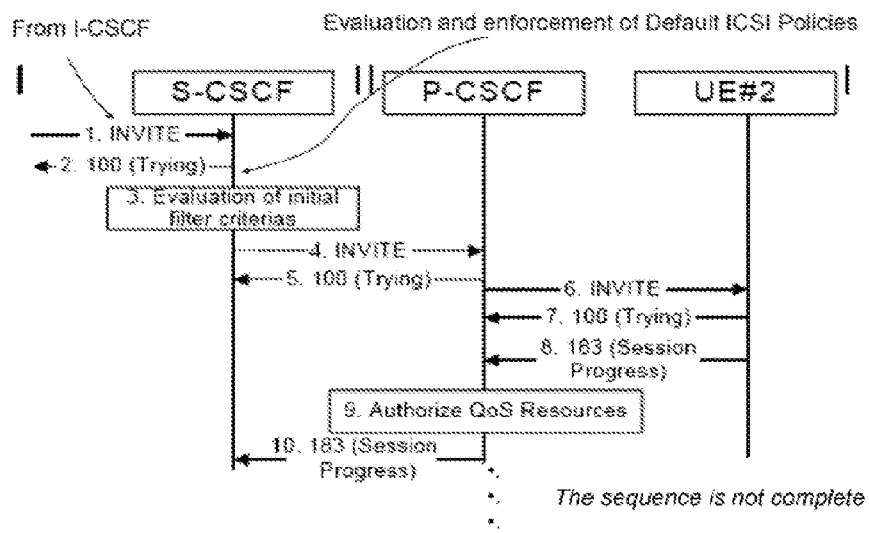

FIG. 7 shows in more detail an example of a terminating case according to the 3GPP specifications (TS 23.228 and TS 24.229), which will be understood by a skilled person. The SIP Invite is used to illustrate the principle. As mentioned above, the same principle is applicable also for other SIP requests.

FIG. 7 depicts a message sequence diagram comprising a first action 1 in which an INVITE from an I-CSCF is received by the S-CSCF.

In action 2, a "100 Trying" message is sent back by the S-CSCF. In this action the default ICSI information may be evaluated, for instance, the default ICSI policy may be executed.

In action 3, Initial Filter Criterias are evaluated by the S-CSCF.

In action 4 the INVITE is forwarded by the S-CSCF to the P-CSCF and in action 5, a "100 Trying" message is sent back by the P-CSCF to the S-CSCF.

In action 6 the INVITE is forwarded by the P-CSCF to a user terminal UE#2 and in action 7, a "100 Trying" message is sent back by the user terminal UE#2 to the P-CSCF.

In action 8, the user terminal UE2# sends a "183 Session Progress" to the P-CSCF.

In action 9, the QoS resources are authorized by the P-CSCF.

In action 10, the "183 Session Progress" is forwarded by the P-CSCF to the S-CSCF.

It is noted that this flow diagram is not complete.

For AS originated calls that are not established on a user's behalf, the S-CSCF can use a node global value, typically provisioned to the S-CSCF as part of exchange data. The S-CSCF that receives an AS originated call that is not on behalf of a user terminal UE, could include a default ICSI that is not particular for the respective user terminal UE but is a node global value, i.e. is a default ICSI stored on the S-CSCF for all AS originated calls that are not on behalf of a user terminal UE.

Further Remarks

As mentioned above, the term INITIAL REQUEST is used to refer to any request that is used to set up a session and may not necessarily be the actual first request exchanged. The INITIAL REQUEST to set up a session may in fact be divided in more than one message transmitted through the IMS network.

As described above, the INITIAL REQUEST may comprise a valid ICSI, meaning comprising an ICSI that is recognized and supported. If no ICSI is comprises or an ICSI is comprised that is not recognized or supported, the ICSI is referred to as non-valid.

The P-CSCF and the S-CSCF are here described as separate modules. However, it will be understood that the P-CSCF and the S-CSCF may be formed as one module, for instance formed as one computer, integrating the functionality of both the P-CSCF and the S-CSCF.

The P-CSCF, S-CSCF and the HSS as here described may be formed as computers. Such computers may comprise or have access to memory comprising instructions that are readable and executable by the processor unit PU to enable the computer 10 to perform the embodiments described.

According to an embodiment there is provided a computer program that, when loaded on a computer, provides the computer with the functionality to perform one of the methods described here. According to a further embodiment, there is provided a data carrier, comprising such a computer program. The data carrier may be a memory, a floppy, a CD, DVD etc.

The embodiments above relate to an IMS network, but it will be understood that that the embodiments may also be put to practice in other networks, generally referred to as communications networks, like a GSM, Code Division Multiple Access (CDMA), Time Division Multiple Access (TDMA), Universal Mobile Telecommunication System (UMTS), or 4G network.

Also, the P-CSCF and the S-CSCF are examples of entities in which the embodiments may be employed. Of course, it will be understood that the embodiments may be put to practice in similar other entities playing similar roles. These entities may be referred to as control entities, for instance being a S-CSCF or a P-CSCF.

Also, the embodiments refer to a home subscriber server (HSS). However, it will be understood that this may more generally be referred to as a subscriber database, for instance being a home subscriber server (HSS).

The embodiments above describe an IMS Communication Service Identifier, but it will be understood that in general, the embodiments relate to any Communication Service Identifier, for instance being an IMS Communication Service Identifier. Accordingly, a default CSI procedure may be provided, for instance being the default ICSI procedure described above, where the default CSI procedure uses default CSI information, for instance being default ICSI information.

The descriptions above are intended to be illustrative, not limiting. Thus, it will be apparent to one skilled in the art that modifications may be made to the invention as described without departing from the scope of the claims set out below.

The invention claimed is:

1. A subscriber database configured to be part of a communications network, the subscriber database including or having access to memory for storing subscription information, the subscriber database comprising:
   an input device configured to receive a register message from a user terminal;
   a processor unit configured to process the register message, and in response to receipt of the register message, to generate default Communication Service Identifier (CSI) information based upon subscription information stored in the memory;
   an output device configured to transmit the generated default CSI information to at least one control entity in the communications network.

2. The subscriber database of claim 1 wherein the default CSI information is specific for the user terminal the register message is received from.

3. The subscriber database of claim 1:
   where the subscriber database is arranged to work in an IP Multimedia Subsystem (IMS) network;
   wherein the subscriber database is a home subscriber server (HSS).

4. A method for registering a user terminal in a communications network, the method being implemented by a subscriber database and comprising:
   receiving a register message from a user terminal;
   generating default Communication Service Identifier (CSI) information based upon subscription information in response to the receipt of the register message;
   transmitting the generated default CSI information to at least one Control Entity in the communications network.

5. The method of claim 4 wherein the default CSI information is specific for the user terminal from which the register message is received.

* * * * *